United States Patent [19]

Hunt

[11] Patent Number: 4,735,532
[45] Date of Patent: Apr. 5, 1988

[54] SPINDLE WITH POSITIVE LOCK DRAWBAR

[75] Inventor: Carl E. Hunt, Milford, Mich.

[73] Assignee: GTE Valeron Corporation, Troy, Mich.

[21] Appl. No.: 946,231

[22] Filed: Dec. 24, 1986

[51] Int. Cl.[4] .......................... B23C 5/26; B23B 31/26
[52] U.S. Cl. .................................... 409/233; 409/232
[58] Field of Search ................................ 409/231–234; 279/89

[56] References Cited

U.S. PATENT DOCUMENTS 3,762,271 10/1973 Poincenot .......................... 409/233

Primary Examiner—Eugene F. Desmond
Assistant Examiner—Steven C. Bishop
Attorney, Agent, or Firm—David J. Koris

[57] ABSTRACT

A cutting tool holder wherein a cutting tool can be released from a drawbar by selectively causing the drawbar to move along a longitudinal axis in a first direction. The drawbar is positively locked in place to prevent such movement during the cutting operation.

20 Claims, 3 Drawing Sheets

SPINDLE WITH POSITIVE LOCK DRAWBAR

BACKGROUND OF THE INVENTION

The present invention relates to a cutting tool holder which circumscribes a longitudinal axis and is adapted for having coupled thereto at least one cutting tool, the cutting tool holder being of the type wherein there is relative rotational movement about such axis between the cutting tool and a workpiece.

FIG. 1 schematically depicts a prior art cutting tool holder 2 wherein a cutting tool is coupled thereto in a known manner. In particular, the cutting tool holder 2 comprises a housing 4 which includes a shaft 6 extending therethrough, the housing and shaft generally circumscribing a longitudinal axis 8. Shaft 6 is affixed to an end member 10 which is positioned within a cavity 12 of housing 4 for reciprocation along axis 8. End member 10 abuts a flanged portion of the housing 4. Cavity 12 is closed at one end by the end member 10 and at the other end by a cap 14. Shaft 6 extends within cavity 12 and is concentric with a spring 16 which bears against end member 10 and cap 14 to urge the end member and shaft affixed thereto in the direction of arrow 18. The end of shaft 6 which extends beyond housing 4 includes a generally cylindrical portion 20 to which is coupled a cutting tool 22 having a mating cylindrical bore 24 into which the cylindrical portion 20 extends. During the cutting operation it is desirable to hold the cutting tool 22 in place relative to the cutting tool holder 2. It is to this end that spring 16 is provided to urge the end member 10 and shaft 6 in the direction of arrow 18 so that the cutting tool 22 is caused to bear against cap 14. When the cutting tool 22 is to be replaced, a force is exerted against the end member 10 in the direction of arrow 26 in a known manner causing the end member 10, shaft 6 and cutting tool 22 to move to the position shown in phantom lines in FIG. 1. In this position, the cutting tool 22 no longer abuts cap 14, and the cutting tool 22 can be removed from the cylindrical portion 20 of the shaft.

A problem incurred in such prior art cutting tool holders is that there is a tendency for the pressures exerted against the cutting tool during the cutting operation to move the shaft 6 in the direction of arrow 26 against the forces exerted by spring 16. In viewing FIG. 1, such pressures tend to move shaft 6 toward the right which removes the cutting tool 22 from abutting engagement with cap 14. The result of such movement is that the cutting tool 22 becomes undesirably loose relative to the shaft 6. This is particularly noticeable in milling and very heavy, large overhang turning or boring operations.

Although it might appear that this problem can be overcome by providing a spring 16 which exerts a very great force in the direction of arrow 18 of FIG. 1, the use of such a spring will cause other problems. For example, increasing the spring pressure of spring 16 will require a corresponding increase in the force required to remove the cutting tool when desired; that is, the force exerted against end member 10 and spring 16 in the direction of arrow 26. In this application where such opposite force is effected by hydraulic means, a relatively large hydraulic cylinder will be required. And, in apparatus wherein the cutting tool rotates to cut the workpiece, the result will be the exertion of undesirable forces upon the bearing structure causing premature wear and possible disorientation of the cutting tool.

It is highly desirable to provide a cutting tool holder wherein the cutting tool does not become loose during the cutting operation.

It is further desirable to provide such apparatus wherein the cutting tool can be positively locked into position relative to such holder and yet be readily removed therefrom when desired.

It is also desirable to provide such a cutting tool holder relative to prior art apparatus wherein less spring pressure is required to position the cutting tool relative to the holder.

SUMMARY OF THE INVENTION

This invention achieves these and other results by providing a cutting tool holder circumscribing a longitudinal axis and adapted for having coupled thereto at least one cutting tool. The cutting tool holder is of the type wherein there is relative rotational movement about the axis between the cutting tool and a workpiece being cut thereby. The cutting tool holder includes a spindle shaft having an opening therethrough extending along the axis from one end of the spindle shaft to the other end. A drawbar is provided for reciprocation within such opening along the axis and includes a first end extending outside of the shaft and adapted for coupling to the cutting tool and a second end extending into the opening at such one end of the spindle shaft. A push rod mounted for reciprocation within the opening along the axis includes a first end extending towards such one end of the spindle shaft and the second end of the drawbar, and a second end opposite such first end. Means are positioned relative to the drawbar for exerting a first force against the drawbar in a first direction to urge the drawbar into such opening at the one end of the spindle shaft so that the cutting tool is held in place relative to the drawbar by being urged against the one end of the spindle shaft. Means are also positioned relative to the push rod for selectively urging the push rod towards the one end of the spindle shaft to exert a second force, greater than the first force, against the drawbar in a second direction opposite to the first direction so that the cutting tool is releasable relative to the drawbar by being urged away from the one end of the spindle shaft. Means are positioned within the opening of the spindle shaft for controlling movement of the drawbar along the axis by positively preventing movement of the drawbar along the axis when the cutting tool is so held in place by the first force and allowing movement of the drawbar along the axis when the second force is greater than the first force.

BRIEF DESCRIPTION OF THE DRAWINGS

The objects, features and advantages of the present invention will be clearly understood to those skilled in the art by reference to this disclosure and the attached drawings in which.

DESCRIPTION OF A PREFERRED EMBODIMENT

Figure 2:
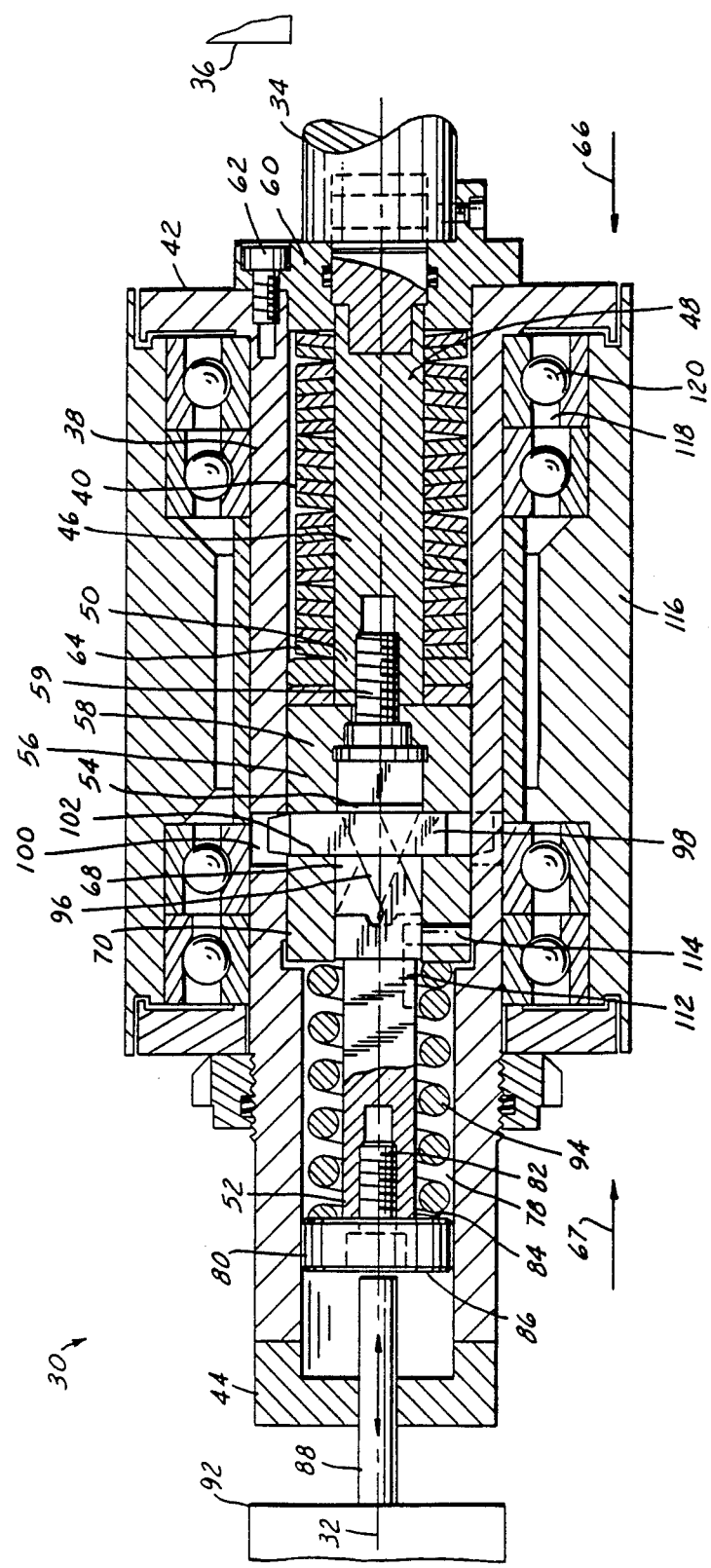
FIG. 2 is a side view on cross-section of one embodiment of a cutting tool holder of the present invention in a first mode of operation.

The embodiment of this invention which is illustrated in FIG. 2 is particularly suited for achieving the objects of this invention. FIG. 2 depicts a cutting tool holder 30 circumscribing a longitudinal axis 32 and adapted for having coupled thereto at least one cutting tool 34. The cutting tool holder 30 is of the type wherein there is relative rotational movement about axis 32 between the cutting tool 34 and a workpiece 36 being cut thereby. Generally, there are two types of apparatus which embody such relative rotational movement. In one, the cutting tool is stationary and the workpiece is caused to rotate. In the other, the cutting tool rotates and the workpiece is stationary. The present invention is equally directed to both types of apparatus although the embodiment described herein is by way of example with respect to a rotary cutting tool and stationary workpiece.

In the embodiment of FIG. 2, a spindle shaft 38 is provided having an opening 40 extending therethrough along axis 32 from one end 42 of the shaft to the other end 44. A drawbar 46 is provided for reciprocation within opening 40 along axis 32. Drawbar 46 includes a first end 48 extending outside of spindle shaft 38 and adapted for coupling to the cutting tool 34 and a second end 50 extending into the opening 40 at end of the shaft 38. A push rod 52 is mounted for reciprocation within opening 40 along axis 32 and includes a first end 54 which extends towards end 42 of shaft 38 and second end 50 of drawbar 46. Push rod 52 also includes a second end 78 opposite first end 54.

Means are positioned relative to drawbar 46 for exerting a first force against the drawbar in a first direction to urge the drawbar into the opening 40 at end 44 of the spindle shaft 38 so that the cutting tool 34 is held in place relative to the drawbar by being urged toward end 42 of the shaft. For example, in the embodiment depicted in FIG. 2, a push rod holder 56 is positioned within opening 40 for reciprocation therein along axis 32. The second end 50 of the drawbar 46 is coupled to the second end 58 of the push rod holder by a screw 59. A retaining cap 60 is affixed to shaft 38 at end 42 by screws 62, only one being shown. A spring 64 is positioned within opening 40 and bears against the second end 58 of push rod holder 56 and the retaining cap 60 for exerting a first force against drawbar 46 through push rod holder 56, in a first direction designated by arrow 66 to urge the drawbar in the direction of arrow 66 into the opening 40 so that the cutting tool 34 is urged against the retaining cap 60 of end 42.

Push rod holder 56 includes a cavity 68 therein extending along axis 32 from a first end 70 of the push rod holder towards its second end 58. End 54 of push rod 52 extends into the first end 70 of push rod holder 56, and drawbar 46 is coupled to the second end 58 of the push rod holder by screw 59 which extends through an opening in second end 58 and into the drawbar.

Means are positioned relative to push rod 52 for selectively urging the push rod toward end 42 of shaft 38 to exert a second force, greater than the first force, against the drawbar in a second direction designated by arrow 67 opposite to the first direction 66 so that the cutting tool 34 is releasable relative to the drawbar by being urged away from end 42 of shaft 38. For example, in the embodiment of FIG. 2, the push rod 52 includes a second end 78, opposite the first end 54, having a piston 80 attached thereto by screw 82. The piston 80 is positioned within opening 40 of shaft 38 and includes a first surface 84 facing end 42 of shaft 38 and a second surface 86 facing the other end 44 of shaft 38. In this embodiment, push rod 52 is selectively urged toward end 42 of shaft 38 by connecting rod 88 which is caused to exert a force against second surface 86 of piston 80 when desired. In the preferred embodiment, connecting rod 88 is selectively caused to exert such a force against second surface 86 in a known manner such as by hydraulic member 92 schematically depicted in FIG. 2. Other drive mechanisms known to those skilled in the art may be used such as a motor microscrew member may be employed to selectively exert reciprocating force on connecting rod 88.

In the apparatus so far described, the first force exerting means includes spring 64 bearing against the second end 58 of push rod holder 56. Means for selectively exerting an opposite second force includes connecting rod 88 which bears against second surface 86 of piston 80 to effect such second force when the connecting member is actuated by hydraulic member 92 (not shown). As will be described in greater detail herein; when the first force exerted by the spring is greater than the second force exerted by the connecting member, the spring urges the push rod holder 56 and drawbar 46 attached thereto into opening 40 and toward end 44 of shaft 38 so that the cutting tool 34 is thereby held in place against retainer cap 60. When the hydraulic member 92 is selectively caused to actuate connecting member 88 so that it exerts a second force against surface 86 of piston 80, which is greater than the first force exerted by spring 64 against push rod holder 56, such second force urges the push rod towards end 42 of shaft 38. The push rod thereby engages the push rod holder to urge the drawbar and cutting tool away from retaining cap 60 on end 42 of shaft 38.

A third force exerting means is also positioned within opening 40 of shaft 38 between piston 80 and push rod holder 56 for urging the push rod towards end 44 of shaft 38 when the first force is greater than the second force. For example, in the embodiment of FIG. 2, a spring member 94 is provided one end of which bears against the push rod holder and the other end of which bears against the first surface 84 of piston 80. The first force exerted by spring 64 is greater than the third force exerted by spring member 94 and when selected, the second force of hydraulic member 92. Alternatively, when urging the push rod toward end 44 of shaft 38, a selected second force initiated by hydraulic member 92 may be greater than the third force of spring 94 and the first force of spring 64. Such third force urges the connection rod 88, and push rod toward end 42 of shaft 38. The push rod thereby engages the push rod holder as above to urge the cutting tool away from end 42 of the shaft.

Means are positioned within opening 40 of shaft 38 for controlling the movement of drawbar 46 along axis 32 by positively preventing movement of the drawbar along the axis when the cutting tool is held in place as a result of the first force being greater than the second and third forces and allowing movement of the drawbar along the axis in the direction of arrow 67 when the second force as selected is greater than the third and first forces. For example, the embodiment illustrated in FIG. 2 provides at least one camming surface 96, forming a portion of push rod 52, and at least one lock pin 98 mating with the camming surface. When the second force overcomes the third force exerted by spring 94, lock pin 98 is urged in one direction along camming surface 96 to one position which will allow movement of drawbar 46 along axis 32 in the direction of arrow 67. When the first force is greater than the second and third forces, drawbar 46 is caused to move along axis 32 in the direction of arrow 66 to a point where cutting tool 34 is seatingly biased against retaining cap 60 in an at rest position. When the diminishing second force is finally overcome by the third force, lock pin 98 is urged in an opposite direction along camming surface 96 to another position which prevents movement of the drawbar along axis 32.

Figure 3:
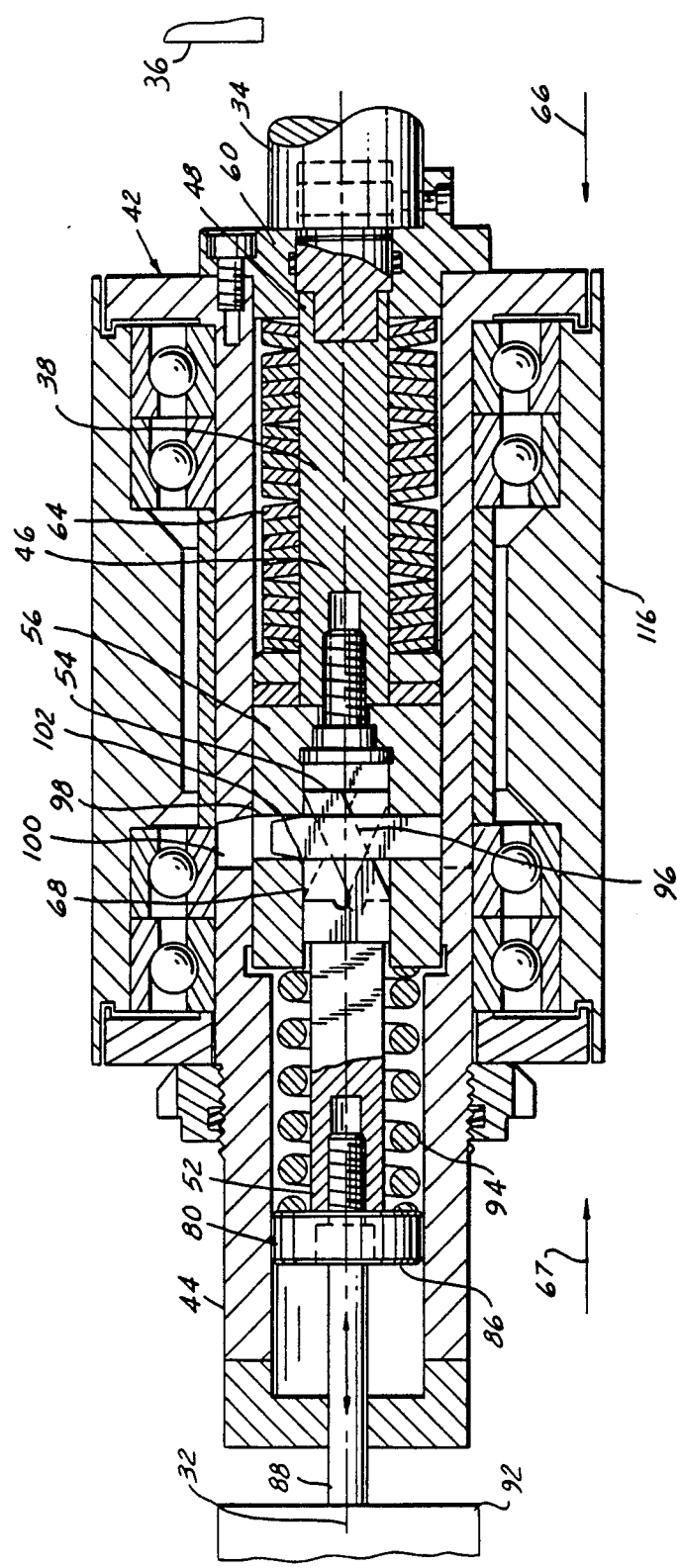
FIG. 3 is a partial view of the embodiment of FIG. 2 in a second mode of operation; and, FIG. 4 is an exploded view of the push rod and lock pins of the present invention.

In the preferred embodiment, the portion of the push rod 52 having the camming surface 96 extends into the push rod holder 56 for reciprocation along axis 32. Such reciprocation causes the camming surface 96 to urge lock pin 98 in one direction or the opposite direction depending upon the direction of movement of the push rod. For example, in the embodiment of FIG. 2, the spindle shaft 38 includes at least one radial bore 100, and the push rod holder 56 includes at least one radial bore 102 which extends therethrough and can be aligned with bore 100. Lock pin 98 is reciprocatingly mounted within bore 102 and reciprocates therein as the lock pin slides upon camming surfaces 96. The direction of movement of pin 98 depends upon the direction of movement of the camming surface. For example, the lock pin 98 can be retracted entirely within the bore 102 in one position, as depicted in FIG. 3 when the camming surface is caused to move along axis 32 towards end 42 of shaft 38. Such movement is effected when the force exerted against piston 80 by the connecting rod 88 is greater than the opposite force exerted against piston 80 by spring 94. Fully retracting lock pin 98 within bore 102 allows continued movement of the push rod 52 along axis 32 in the direction of arrow 67 so that the first end 54 of the push rod 52 engages the base of cavity 68 of push rod holder 56 to urge the push rod holder and drawbar attached thereto along axis 32 in the direction of arrow 67 so that the cutting tool 34 can be removed from end 48 of the drawbar.

When the third force exerted against piston 80 by spring 94 is greater than the diminishing second force exerted by piston 80 via connecting member 88, camming surface 96 is caused to move along axis 32 toward end 44 of shaft 38 moving lock pin 98 from bore 102 to bore 100. Seating of the cutting tool is facilitated via spring 64 by applying a first force to push rod holder 56 and retaining cap 60. In addition, positioning the push rod holder 56 in relation to the retaining cap 60 facilitates alignment of bores 100 and 102. By extending lock pin 98 into bore 100, movement of push rod holder 56 and drawbar 46 along axis 32 is prevented.

Figure 4:
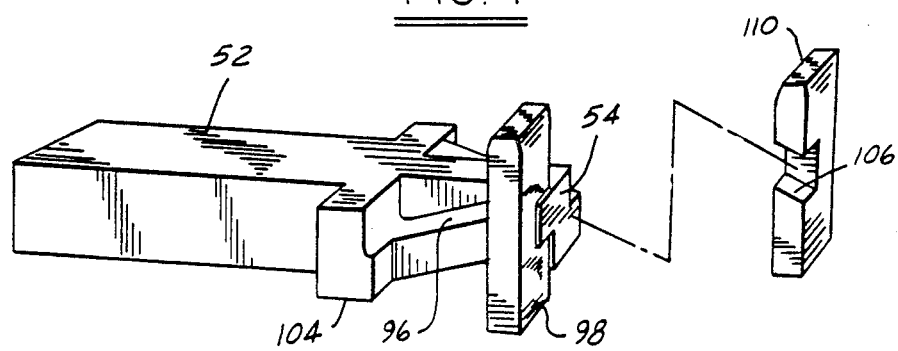

In the preferred embodiment, the cutting tool holder includes two camming surfaces 96 and two lock pins 98. Although only one of each is depicted in FIG. 2, the plurality of such camming surfaces and lock pins and their relative positioning is evident from FIG. 4. Referring to FIG. 4, end 54 of push rod 52 includes first and second camming surfaces 96 which extend upwardly and downwardly, respectively, from mid-portion 104 of the push rod. Corresponding first and second lock pins 98 have recessed areas 106 which extend upwardly and downwardly, respectively, for mating with corresponding camming surfaces 96. Recessed areas 106 slide along camming surfaces 96 as push rod 52 is reciprocated along axis 32 as described herein.

In the preferred embodiment, entry of the lock pin 98 into the bore 100 is facilitated by providing a bevelled surface portion 108 of bore 100 (as seen in FIG. 2) and a corresponding bevelled surface portion 110 (as seen in FIG. 4) at the end of lock pin 98 which extends into bore 100; that is, the radial bore 100 is bevelled for sliding engagement with the bevelled portion of the lock pin. The bevelled portion also functions to compensate for minor misalignment problems between bores 102 and 100 and the lock pin.

In order to key the push rod 52 to the push rod holder 56 during the reciprocation of the push rod along axis 32, the push rod is provided with a keyway 112 and the push rod holder includes a pin 114 extending from the holder to the keyway for riding therein during such reciprocation.

In the apparatus of FIG. 2, the cutting tool holder 30 is of the type wherein the holder and cutting tool 34 coupled thereto rotates about axis 32 to cut the workpiece 36 in a known manner. To this end the holder is provided with an outer housing 116. The housing 116 includes a cavity 118 in which the spindle shaft 38 extends along axis 32. The spindle shaft is mounted within cavity 118 for rotation in a known manner relative to the outer housing 116 about axis 32. To facilitate such rotation bearings 120 are provided.

Figure 1:
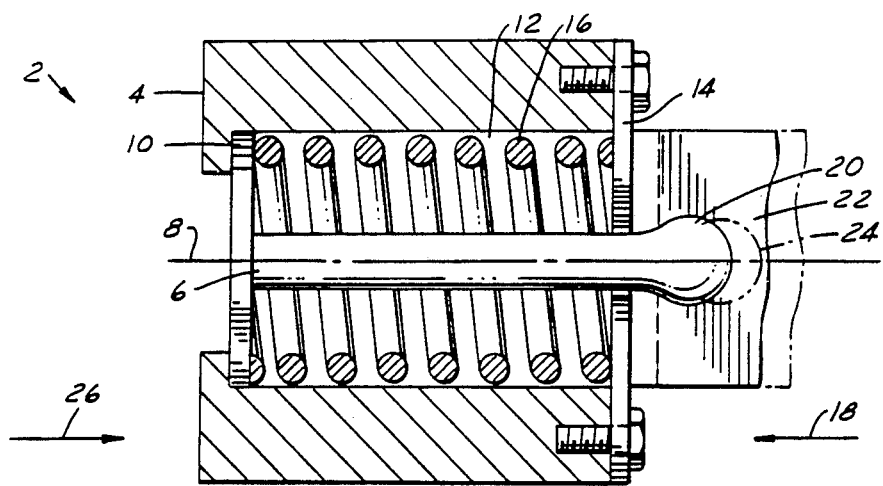
FIG. 1 is a schematic representation of a prior art cutting tool holder.

In operation, and with reference to the embodiment depicted in FIG. 2, spindle shaft 38 is caused to rotate in a known manner so that cutting tool 34 cuts workpiece 36. During the cutting operation, the force exerted by spring 64 against push rod holder 56 is greater than the force exerted against surface 86 of piston 80 by the connecting member 88. As a result, the push rod holder 56 and drawbar 46 attached thereto are urged in the direction of arrow 66 into the cavity 40 towards end 44 of shaft 38. In this manner the cutting tool 34, which is coupled to end 48 of the drawbar in the same manner as depicted in FIG. 1 with respect to the prior art device, is urged against retainer cap 60 at end 42 of shaft 38 so that the cutting tool is held in place. Unlike the prior art device of FIG. 1, however, the cutting tool 34 is positively locked into position relative to the cutting tool holder and will not become loose during the cutting operation. In particular, during the cutting operation the lock pins 98 extend from radial bores 102 into radial bores 100 to prevent movement of the push rod holder 56 and drawbar 46 attached thereto along axis 32. Although the cutting tool is positively locked into place, it can be readily removed from the cutting tool holder. In particular, when it is desired to replace cutting tool 34, rotation of shaft 38 is terminated. The connecting member 88 is caused to bear against surface 86 in a known manner by means of a selective and reversible hydraulic member 92 to the point where the force exerted by connecting member 88 against surface 86 is greater than the opposing force exerted by spring 94 against surface 84 of the piston 80. In this condition, spring 94 compresses causing push rod 52 to move along axis 32 towards end 42 of shaft 38. During such movement, lock pins 98 slide along camming surfaces 96 and are withdrawn from radial bores 100. By causing the second force to be greater than the third force, the pins are completely withdrawn and the end 54 of the push rod 52 engages the base of the opening 68 of the push rod holder, as will occur in the embodiment depicted in FIG. 3. Continued movement of the push rod towards end 42 of shaft 38 will compress the first force spring 64 and urge the push rod holder and drawbar attached thereto away from end 44 of shaft 38 so that the cutting tool 34 is urged away from the retainer cap 60. In such position, the cutting tool 34 can be readily removed from end 48 of drawbar 46. When a replacement cutting tool 34 is subsequently coupled to end 48, the force exerted by the connecting member 88 against surface 86 is relieved by hydraulic member 92 until the force exerted by spring 64 is greater than the force exerted by the connecting member 88 and by spring 94. In this condition, cutting tool 34 is reseated against end cap 60 as spring 64 urges the push rod holder 56 and drawbar 46 attached thereto toward end 44. Once seated, the weaker third force spring 94 urges piston 80 and push rod 52 attached thereto towards end 44 of shaft 38 overcoming the third hydraulic force. During such movement of the push rod, bores 100 and 102 move toward alignment and lock pins 98 slide along camming surfaces 96. Once aligned with bores 100, the pins are caused to extend from bores 102 into bores 100 to once again lock the drawbar in place firmly seating the cutting tool against retainer cap 60. By providing such a positive locking mechanism, less spring pressure is required of spring 64 to hold the cutting tool in place against the forces generated during the cutting operation. Correspondingly, the hydraulic member 92 need only generate sufficient pressure to overcome the first force exerted by spring 64, and therefore the use of the relatively simple device of the present invention is possible. In addition, the third force exerted by spring 94 need only be sufficient to hold the locking pin in bores 100.

The embodiments which have been described herein are but some of several which utilize this invention and are set forth here by way of illustration but not by way of limitation. It is apparent that many other embodiments which will be readily apparent to those skilled in the art may be made without departing materially from the spirit and scope of this invention.

I claim:

1. A cutting tool holder circumscribing a longitudinal axis and adapted for having coupled thereto at least one cutting tool, said cutting tool holder being of the type wherein there is relative rotational movement about said axis between said cutting tool and a workpiece being cut thereby, comprising:
    a spindle shaft having a bore therethrough extending along said axis;
    a drawbar mounted for reciprocation within said bore having a first end adapted for coupling to said cutting tool and a second end extending into said bore;
    a push rod mounted for reciprocation within said bore and extending toward said second end of said drawbar;
    means for exerting a first force against said drawbar in a first direction to urge said drawbar toward one end of said bore and urge said coupled cutting tool against said spindle;
    second force means weaker than said first force, positioned relative to said push rod for selectively urging said push rod toward said drawbar for urging said cutting tool away from said spindle; and,
    means axially positioned between said drawbar and said push rod for controlling movement of said drawbar along said axis by positively preventing movement of said drawbar when said cutting tool is so held in place by said first force and allowing movement of said drawbar along said axis when said second force is caused to overcome said first force.

2. The cutting tool holder of claim 1 wherein said means for controlling movement of said drawbar along said axis includes at least one camming surface forming a portion of said push rod and at least one lock pin mating with said camming surface, said at least one lock pin being urged in one direction along said at least one camming surface to one position which allows movement of said drawbar along said axis when said second force is greater than said first force so that said push rod is urged towards said one end of said spindle shaft, and when said first force is greater than said second force, said at least one lock pin being urged in another direction along said at least one camming surface to another position which prevents movement of said drawbar along said axis when said cutting tool is so held in place by said first force.

3. The cutting tool holder of claim 2 further including a push rod holder positioned within said spindle shaft opening for reciprocation therein along said axis, said push rod holder having a cavity therein extending along said axis from a first end of said push rod holder towards a second end of said push rod holder, the portion of said push rod having said at least one camming surface extending into said first end of said push rod holder for reciprocation therein along said axis and the second end of said drawbar being coupled to said second end of said push rod holder, said first force exerting means including a spring bearing against said second end of said push rod holder to so urge said drawbar into said opening when said first force is greater than said second force, and said selectively urging means exerts said second force against said second end of said push rod to so urge said push rod towards said one end of said spindle shaft when said second force is greater than said first force.

4. The cutting tool holder of claim 3 wherein said spindle shaft includes at least one first radial bore, and said push rod holder includes at least one second radial bore which extends therethrough and can be aligned with said at least one first radial bore, said at least one lock pin reciprocatingly mounted within said at least one second radial bore and being retrated entirely within said at least one second radial bore to said one position when said second force is greater than said first force, and being extended from said at least one second radial bore into said at least one first radial bore to said another position when said first force is greater than said second force and said cutting tool is so held in place by said first force.

5. The cutting tool holder of claim 4 further including a piston attached to said second end of said push rod, said piston being positioned within said opening of said spindle shaft and having a first surface facing said one end of said spindle shaft and a second surface facing said other end of said spindle shaft.

6. The cutting tool holder of claim 5 further including means positioned within said opening of said spindle shaft between said piston and said push rod holder for urging said push rod towards said other end of said spindle shaft when a force exerted by said urging means is greater than said second force.

7. The cutting tool holder of claim 6 wherein said urging means is a spring member one end of which bears against said push rod holder and the other end of which bears against said first surface of said piston.

8. The cutting tool holder of claim 7 wherein said means for selectively urging said push rod towards said one end of said spindle shaft comprises a connecting member which is coupled to a hydraulic member which is selectively pressurized so that said connecting member bears against said second surface of said piston when desired.

9. The cutting tool holder of claim 3 wherein said push rod includes a keyway extending along said axis and said push rod holder includes a pin extending from said push rod holder to said keyway.

10. The cutting tool holder of claim 1 including an outer housing, said housing including a cavity in which said spindle shaft extends along said axis, said spindle shaft being mounted within said cavity for rotation relative to said outer housing about said axis.

11. The cutting tool holder of claim 2 wherein said means for selectively urging said push rod towards said one end of said spindle shaft comprises a connecting member which is coupled to a hydraulic member which is selectively pressurized so that said connecting member bears against said ssecond surface of said piston when desired.

12. The cutting tool holder of claim 6 wherein said means for selectively urging said push rod towards said one end of said spindle shaft comprises a connecting member which is coupled to a hydraulic member which is selectively pressurized so that said connecting member bears against said6. rface of said piston when desired.

13. The cutting tool holder of claim 2 including two of said at least one camming surface and two of said at least one lock pin.

14. The cutting tool holder of claim 3 including two of said at least one camming surface and two of said at least one lock pin.

15. The cutting tool holder of claim 4 including two of said at least one camming surface and two of said at least one lock pin.

16. The cutting tool holder of claim 15 wherein each first radial bore includes a bevelled surface portion and further wherein the end of each of said lock pins which extends into a respective first radial bore is bevelled for sliding engagement with said bevelled surface portion.

17. The cutting tool holder of claim 5 wherein each first radial bore includes a bevelled surface portion and further wherein the end of each of said lock pins which extends into a respective first radial bore is bevelled for sliding engagement with said bevelled surface portion.

18. The cutting tool holder of claim 7 wherein each first radial bore includes a bevelled surface portion and further wherein the end of each of said lock pins which extends into a respective first radial bore is bevelled for sliding engagement with said bevelled surface portion.

19. The cutting tool holder of claim 8 wherein each first radial bore includes a bevelled surface portion and further wherein the end of each of said lock pins which extends into a respective first radial bore is bevelled for sliding engagement with said bevelled surface portion.

20. The cutting tool holder of claim 9 wherein each first radial bore includes a bevelled surface portion and further wherein the end of each of said lock pins which extends into a respective first radial bore is bevelled for sliding engagement with said bevelled surface portion.

* * * * *